United States Patent

Seshan et al.

[11] Patent Number: 6,055,628
[45] Date of Patent: Apr. 25, 2000

[54] MICROPROCESSOR WITH A NESTABLE DELAYED BRANCH INSTRUCTION WITHOUT BRANCH RELATED PIPELINE INTERLOCKS

[75] Inventors: Natarajan Seshan, Houston; Laurence R. Simar, Jr., Richmond, both of Tex.

[73] Assignee: Texas Instruments Incorporated, Dallas, Tex.

[21] Appl. No.: 09/012,676

[22] Filed: Jan. 23, 1998

Related U.S. Application Data

[60] Provisional application No. 60/036,222, Jan. 24, 1997.

[51] Int. Cl.[7] ..................................................... G06F 15/16
[52] U.S. Cl. .......................... 712/235; 712/241; 712/228
[58] Field of Search .................................... 712/235, 241, 712/228, 233

[56] References Cited

U.S. PATENT DOCUMENTS

| | | | |
|---|---|---|---|
| 4,722,050 | 1/1988 | Lee et al. | 712/205 |
| 5,446,849 | 8/1995 | Minagawa et al. | 712/233 |
| 5,450,556 | 9/1995 | Slavenburg et al. | 712/24 |
| 5,796,998 | 8/1998 | Levitan et al. | 712/239 |
| 5,909,573 | 6/1999 | Sheaffer | 712/240 |

OTHER PUBLICATIONS

Tirumalai et al. (Parallelixation of loops with exits on pipelined architectures) IEEE pp. 200–212, Nov. 1990.

*Primary Examiner*—Meng-Ai T. An
*Assistant Examiner*—Gautam R. Patel
*Attorney, Agent, or Firm*—Gerald E. Laws; Robert D. Marshall, Jr.; Richard L. Donaldson

[57] ABSTRACT

A microprocessor 1 has an instruction fetch/decode unit 10*a–c*, a plurality of execution units, including an arithmetic and load/store unit D1, a multiplier M1, an ALU/shifter unit S1, an arithmetic logic unit ("ALU") L1, a shared multiport register file 20*a* from which data are read and to which data are written, and a memory 22. These units form an instruction execution pipeline that operates without interlocks so that nestable delayed branch instructions are provided. The control circuitry for the instruction execution pipeline is operable to begin processing a second branch instruction having a second target address on a pipeline phase immediately after beginning processing of a first branch instruction having a first target address. Furthermore, the control circuitry has no interlock or delay circuitry to condition processing of the second branch instruction based on processing of the first branch instruction, therefore the program counter circuitry receives the second target address on a pipeline phase immediately after receiving the first target address regardless of whether the first branch is taken or not. Thus, one instruction may be executed from the first target branch address and then the execution sequence can be preempted to the second target address.

14 Claims, 14 Drawing Sheets

FIG. 3A

| Pipeline Phase | Symbol | During this Entire Phase | By the End of This Phase |
|---|---|---|---|
| Program Address Generate | PG | | ▫ Except when a program store is in E1, PFC and PADDR and latched to their next values: either the next 8-word boundary after the current PFC or a branch target address.<br>▫ When a program store is in E1, the PFC remains unchanged and PADDR takes the value from the program store instruction. |
| Program Address Send | PS | ▫ PFC valid on PADDR.<br>▫ If a fetch packet fetch needed, PRS set active. | ▫ If PRS active, PMS latches PADDR. |
| Program Wait | PW | ▫ If the fetch packet indicated by the last PRS is necessary, PDS is asserted. | ▫ If PDS is asserted, PMS latches the last requested fetch packet to be driven during PR. |
| Program Data Receive | PR | ▫ If PDS active during the associated PW, PMS drives requested fetch packet onto PDATA_1. Otherwise the previous fetch packet driven on to PDATA_1 is maintained. | ▫ If it can be determined that the fetch packet requested by an active PDS in PW is needed, CPU latches this fetch packet on PDATA_1. Otherwise, this latch maintains state. |
| Dispatch | DP | | ▫ Parallelism of the fetch packet detected.<br>▫ Instructions in the next requested execute packet in the fetch packet dispatched to the appropriate functional units.<br>▫ Detection of the software breakpoint code in the CREG field detected.<br>▫ Multi-cycle NOP, NOP, SWI, and IDLE decoded because they are not passed to individual functional units.<br>▫ PC of the execute packet in DP latched at the end of the cycle as PCDC. |
| Decode | DC | ▫ PCDC valid. | ▫ Control signals for actions during execute decoded. |

FIG. 3B

| Pipeline Phase | Symbol | During this Phase | By the End of This Phase | CPU has Completed Types |
|---|---|---|---|---|
| Execute 1 | E1 | ▫ All Types: Registers read. | ▫ Type ISS: Results written to the register file.<br>▫ Type ISS: Status written to the control register file.<br>▫ Type LD and ST: Address modifications written to the register file.<br>▫ Type LD and ST: DADDR, DBS, and DRNW latched for next phase.<br>▫ Type ST: DDATA_0 latched for next phase.<br>▫ Type BRANCH: PFC and PADDR latches the target address.<br>▫ Type STP: PADDR latches the destination address if no fetch is pending. PWS latched as active for next phase.<br>▫ Types LD, ST, STP, IMPY: Intermediate states latched. | ▫ ISC.<br>▫ BR. |
| Execute 2 | E2 | ▫ Types LD and ST: DBS active and DADDR valid.<br>▫ Type LD: DRNW active.<br>▫ Type ST: DRNW inactive and DDATA_0 valid. | ▫ Type IMPY: Results written to the register file.³<br>▫ Type IMPY: Status written to the control register file.<br>▫ Types LD and ST: DMS latches ADDR.<br>▫ Type ST: DMS latches DDATA_0.<br>▫ Type STP: PMS latches PDATA_0.<br>▫ Type LD: Intermediate states latched. | ▫ IMPY.<br>▫ STD.<br>▫ STP. |
| Execute 3 | E3 | | ▫ Type LD: DMS latches data requested during the last cycle.<br>▫ Types LD: Intermediate states latched. | |
| Execute 4 | E4 | ▫ Type LD: DMS drives on DDATA_1 data requested during associated E2. | ▫ Type LD: DDATA_1 latched.<br>▫ Types LD: Intermediate states latched. | |
| Execute 5 | E5 | | ▫ Type LD: DDATA_1 right-aligned, either sign-extended or zero-filled, and written to the register file. | ▫ LD. |

FIG. 7
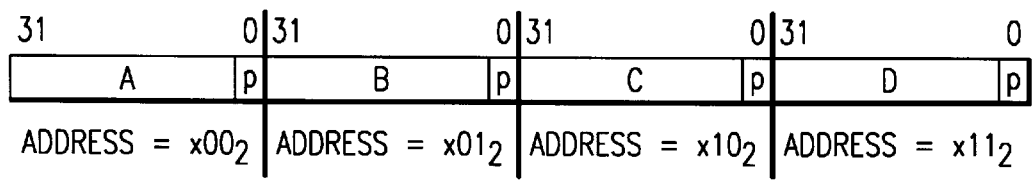
FIG. 8A
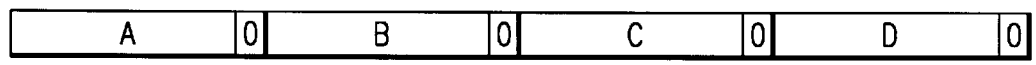
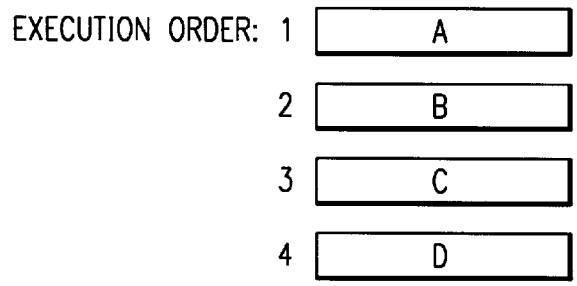
FIG. 8B
FIG. 9A
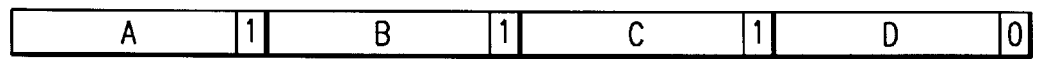
FIG. 9B
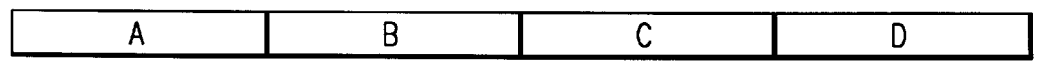

FIG. 13A

| MEMORY ADDRESS: | | | | | | | | | |
|---|---|---|---|---|---|---|---|---|---|
| n | A BR-M | 1 | B | 0 | C BR-M | 1 | D | 0 | ⟵ 1310 |
| n+1 | E BR-M | 1 | F | 0 | G BR-M | 1 | H | 0 | ⟵ 1320 |
| n+2 | I BR-M | 1 | J | 0 | K BR-M | 1 | L | 0 | ⟵ 1330 |
| m | M | 1 | N | 1 | O | 1 | P | 0 | ⟵ 1340 |
| m+1 | Q | 1 | R | 1 | S | 1 | T | 0 | ⟵ 1350 |

FIG. 13B

| EXECUTION ORDER: | | | | | |
|---|---|---|---|---|---|
| 1 | A | B | | | |
| 2 | C | D | | | |
| 3 | E | F | | | |
| 4 | G | H | | | |
| 5 | I | J | | | |
| 6 | K | L | | | |
| 7 | M | N | O | P | ⟵ 1340 |
| 8 | M | N | O | P | ⟵ 1341 |
| 9 | M | N | O | P | ⟵ 1342 |
| 10 | M | N | O | P | ⟵ 1343 |
| 11 | M | N | O | P | ⟵ 1344 |
| 12 | M | N | O | P | ⟵ 1345 |
| 13 | Q | R | S | T | ⟵ 1350 |

MEMORY
ORDER:

*FIG. 14A*

| ADDR | A BR-M | 1 | B | 0 | C BR-M | 1 | D | 0 | /1310 |
| ADDR+1 | E BR-M | 1 | F | 0 | G BR-M | 1 | H | 0 | /1320 |
| ADDR+2 | I BR-M | 1 | J | 0 | K BR-M | 1 | L | 0 | /1330 |
| ADDR+3 | M BR-M | 1 | N | 1 | O | 1 | P | 0 | /1440 |
| ADDR+4 | Q | 1 | R | 1 | S | 1 | T | 0 | /1350 |

EXECUTION
ORDER:

*FIG. 14B*

| | | | | | |
|---|---|---|---|---|---|
| 1 | A | B | | | |
| 2 | C | D | | | |
| 3 | E | F | | | |
| 4 | G | H | | | |
| 5 | I | J | | | |
| 6 | K | L | | | |
| 7 | M | N | O | P | 1440 |
| 8 | M | N | O | P | 1441 |
| 9 | M | N | O | P | 1442 |
| 10 | M | N | O | P | 1443 |
| 11 | M | N | O | P | 1444 |
| 12 | M | N | O | P | 1445 |
| 13 | M | N | O | P | 1446 |
| ∘ | | | | | |
| ∘ | | | | | |
| ∘ | | | | | |
| n | M | N | O | P | 1447 |
| n+1 | Q | R | S | T | 1350 |

FIG. 16A

Operations on the .L unit.

| 31 29 | 28 27 | 23 22 | 18 17 | 13 12 | 11   5 | 4 | 3 | 2 | 1 | 0 |
|---|---|---|---|---|---|---|---|---|---|---|
| creg | z | dst | src2 | src1/cst | x | op | 1 | 1 | 0 | s | p |
| 3 | | 5 | 5 | 5 | | 7 | | | | | |

FIG. 16B

Operations on the .M unit.

| 31 29 | 28 27 | 23 22 | 18 17 | 13 12 | 11   7 | 6 | 5 | 4 | 3 | 2 | 1 | 0 |
|---|---|---|---|---|---|---|---|---|---|---|---|---|
| creg | z | dst | src2 | src1/cst | x | op | 0 | 0 | 0 | 0 | s | p |
| 3 | | 5 | 5 | 5 | | 5 | | | | | | |

FIG. 16C

Operations on the .D unit.

| 31 29 | 28 27 | 23 22 | 18 17 | 13 12 | 11   7 | 6 | 5 | 4 | 3 | 2 | 1 | 0 |
|---|---|---|---|---|---|---|---|---|---|---|---|---|
| creg | z | dst | src2 | src1/cst | op | 1 | 0 | 0 | 0 | s | p |
| 3 | | 5 | 5 | 5 | 6 | | | | | | |

FIG. 16D

Operations on the .S unit.

| 31 29 | 28 27 | 23 22 | 18 17 | 13 12 | 11   6 | 5 | 4 | 3 | 2 | 1 | 0 |
|---|---|---|---|---|---|---|---|---|---|---|---|
| creg | z | dst | src2 | src1/cst | x | op | 1 | 0 | 0 | s | p |
| 3 | | 5 | 5 | 5 | | 6 | | | | | |

FIG. 16E

Load/store with 15-bit offset (on the .D unit)

| 31 29 | 28 27 | 23 22 | 8 7 | 6 | 4 3 | 2 | 1 | 0 |
|---|---|---|---|---|---|---|---|---|
| creg | z | dst/src | cst | y | ld/st | 1 | 1 | s | p |
| 3 | | 5 | 15 | | 3 | | | |

FIG. 16F Load/store 'baseR' + 'offsetR/cst' on the .D unit

| 31 29 | 28 27 | 23 22 | 18 17 | 13 12 | 9 8 7 | 6 4 | 3 | 2 1 | 0 |
|---|---|---|---|---|---|---|---|---|---|
| creg | z | dst/src | base R | offset R/cst | mode | r y | ld/st | 0 1 | s | p |
| 3 | | 5 | 5 | 5 | 4 | 3 | 3 | | | |

FIG. 16G ADDK on the .S unit

| 31 29 | 28 27 | 23 22 | | 7 6 | 4 3 | 2 1 | 0 |
|---|---|---|---|---|---|---|---|
| creg | z | dst | cst | 1 0 1 | 0 0 | s | p |
| 3 | | 5 | 16 | | | | |

FIG. 16H Bitfield operations (immediate forms) on the .S unit

| 31 29 | 28 27 | 23 22 | 18 17 | 13 12 | 8 7 | 6 5 | 4 3 | 2 1 | 0 |
|---|---|---|---|---|---|---|---|---|---|
| creg | z | dst | src2 | csta | cstb | op | 0 0 1 | 0 | s | p |
| 3 | | 5 | 5 | 5 | 5 | 2 | | | | |

FIG. 16K MVK and MVKH on the .S unit

| 31 29 | 28 27 | 23 22 | | 7 6 5 | 4 3 | 2 1 | 0 |
|---|---|---|---|---|---|---|---|
| creg | z | dst | cst | h 1 0 | 1 0 | s | p |
| 3 | | 5 | 16 | | | | |

FIG. 16L Bcond disp on the .S unit

| 31 29 | 28 27 | | 7 6 5 | 4 3 | 2 1 | 0 |
|---|---|---|---|---|---|---|
| creg | z | cst | 0 0 1 | 0 0 | s | p |
| 3 | | 21 | | | | |

6,055,628

MICROPROCESSOR WITH A NESTABLE DELAYED BRANCH INSTRUCTION WITHOUT BRANCH RELATED PIPELINE INTERLOCKS

CROSS REFERENCE TO RELATED APPLICATIONS

This application claims benefit of Provisional Appln. 60/036,222 filed Jan. 24, 1997.

This application is related to coassigned application Ser. No. 09/012,813 filed contemporaneously herewith and incorporated herein by reference.

TECHNICAL FIELD OF THE INVENTION

This invention relates to microprocessors, and particularly relates to microprocessor architectures which have instruction execution pipelines.

BACKGROUND OF THE INVENTION

Microprocessor designers have increasingly endeavored to improve performance in various microprocessors by increasing clock speeds and adding parallelism. Complex data manipulations require execution of a number of instructions, which may require several iterative cycles for various types of data manipulations. Branch instructions are often used during the iterations. Typically, a branch instructions requires one or more clock cycles, or "delay slots," to resolve a branch address and to fetch the target instruction at the branch address. A delayed branch instruction allows another instruction to be executed during the delay slot(s) of a branch instruction. Microprocessors which have pipelined instruction execution circuitry may provide a delayed branch instruction in order to reduce the number of execution cycles which may be lost due to taking or not taking the branch address within the instruction execution sequence. If a second branch is encountered before the target instruction of the first branch instruction is executed, however, the instruction execution pipeline is stalled in order to preserve the order of execution of instructions.

An object of the present invention is to overcome the performance delay caused by stalling an instruction execution pipeline when a second branch instruction occurs in the delay slot(s) of a first branch instruction.

SUMMARY OF THE INVENTION

In general, and in a form of the present invention, a data processing device is provided which has a central processing unit which has an instruction execution pipeline capable of executing nested delayed branch instructions. The pipeline is operable to process and execute a branch instruction having a target address in a fixed number of pipeline phases. A program counter is loaded with the target address on the last phase of the branch instruction execution. Fetch circuitry fetches instruction execution packets using the address in the program counter.

Processing of a second delayed branch instruction may begin on the next phase after processing began for a preceding delayed branch instruction. The target address of the second branch instruction will be loaded into the program counter on the next phase after the target address of the first branch instruction is loaded into the program counter. Thus, complex branching sequences can be created by this innovative nestable delayed branch instruction.

For example, by placing the same target address in a sequence of nested delayed branch instructions, a single phase iteration loop can be formed. Furthermore, by placing a delayed branch instruction in the target instruction fetch packet, a single phase iteration loop of indefinite duration can be formed. This loop can be exited when a selected condition is detected.

In another form of the present invention, a method for operating a central processing unit (CPU) within a data processing device comprises the steps of: providing an instruction execution pipeline which processes and executes a branch instruction in a number of phases; fetching an instruction packet includes a branch instruction with a target address; fetching a second instruction packet which has a branch instruction on the next pipeline phase; receiving the target address of the first branch instruction in a program counter; and receiving the target address of the second branch instruction into the program counter on the next pipeline phase.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIG. 3A is a chart which illustrates the processing phases of an instruction execution pipeline in the microprocessor of FIG. 1;

FIG. 3B is a chart which illustrates the execution phases of the instruction execution pipeline in the microprocessor of FIG. 1;

FIG. 7 illustrates the basic format of an instruction packet utilized in the present invention;

FIG. 8A is one example of an instruction packet according to the format of FIG. 7;

FIG. 8B illustrates the execution sequence defined by the instruction packet of FIG. 8A;

FIG. 9A illustrates another example of an instruction packet according to the format of FIG. 7;

FIG. 9B illustrates the execution sequence defined by the instruction packet of FIG. 9A;

FIG. 13A illustrates an example of a sequence of instruction packets with nested delayed branch instructions according to the present invention which produces a single phase loop which is executed six times;

FIG. 13B illustrates the execution sequence defined by the instruction packets of FIG. 13A;

FIG. 14A illustrates another example of a sequence of instruction packets with nested delayed branch instructions according to the present invention which produces a single phase loop which is executed until a conditional test is met;

FIG. 14B illustrates the execution sequence defined by the instruction packets of FIG. 14A;

FIGS. 16A–16L illustrate the instruction formats for the microprocessor of FIG. 1, and in particular, FIG. 16L illustrates an instruction format for a nestable delayed branch instruction, according to the present invention.

Corresponding numerals and symbols in the different figures and tables refer to corresponding parts unless otherwise indicated.

DETAILED DESCRIPTION OF EMBODIMENTS OF THE INVENTION

Figure 1:
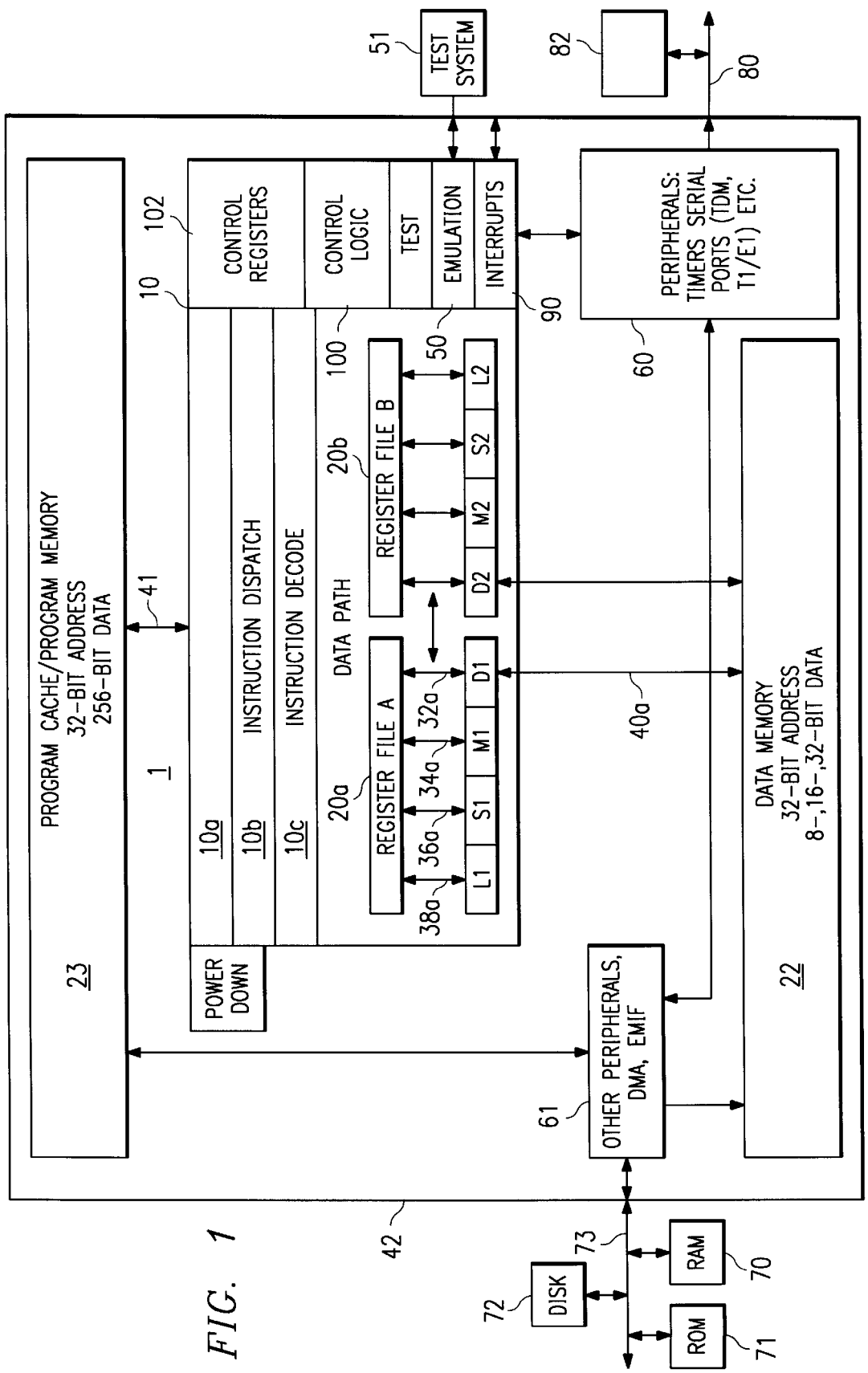
FIG. 1 is a block diagram of a microprocessor which has an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1 is provided in coassigned application Ser. No. 09/012,813. A description of a complete set of instructions for the microprocessor of FIG. 1 is also provided in coassigned application Ser. No. 09/012,813.

Figure 2:
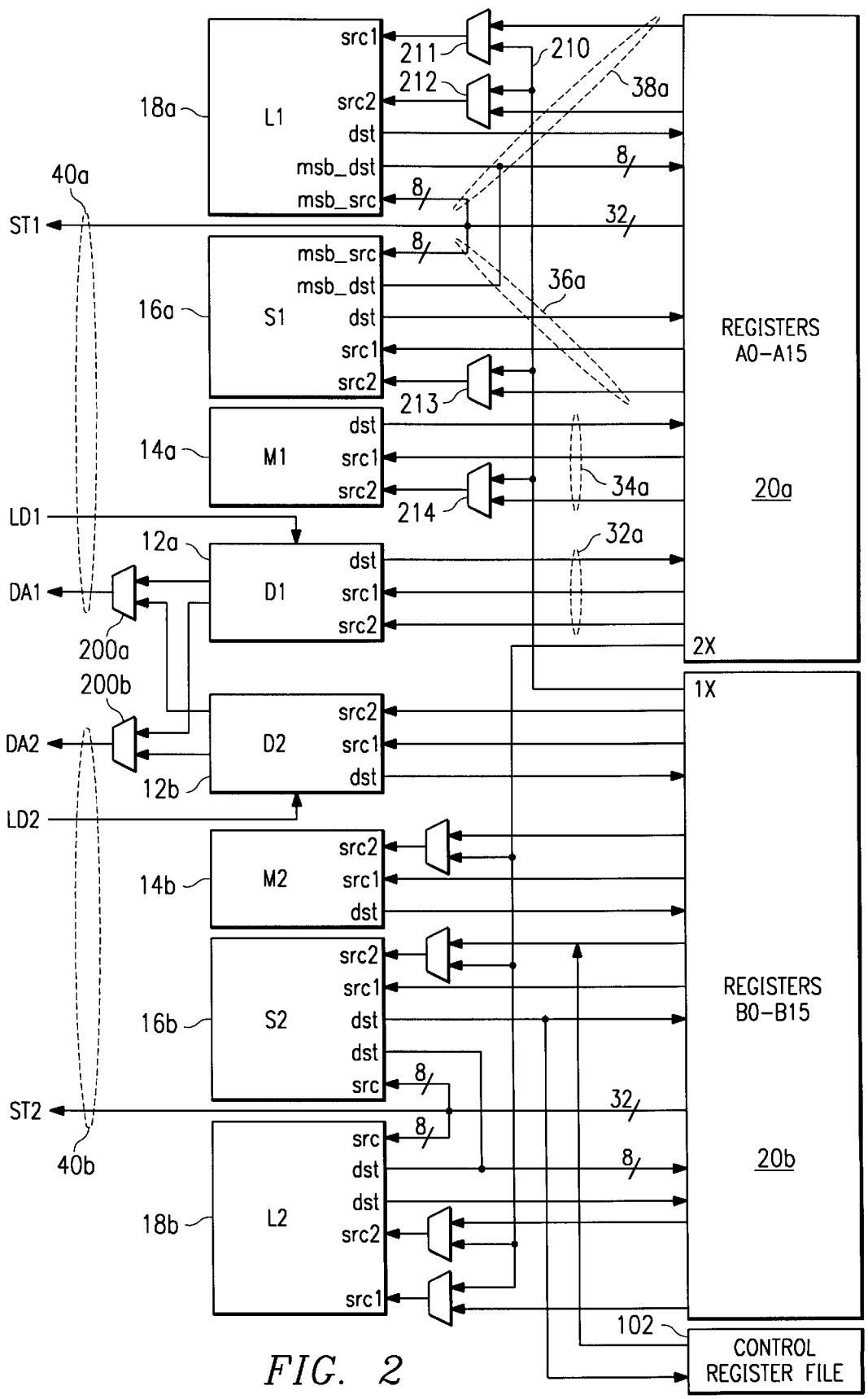
FIG. 2 is a block diagram of the execution units and register files of the microprocessor of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIG. 3A is a chart which illustrates the processing phases of an instruction execution pipeline in the microprocessor of FIG. 1. Each phase corresponds roughly to a clock cycle of a system clock. For example, if microprocessor 1 is being operated at 200 MHz, then each phase is nominally 5 Ns. However, in a phase where data is expected from a memory or peripheral, such as RAM 70, the pipeline will stall if the data is not ready when expected. When stalled, a given pipeline phase will exist for a number of system clock cycles.

In FIG. 3A, the first phase of processing an instruction is to generate the program address in phase PG. This is done by loading a program fetch counter PFC which is located in control register file 102. During the second instruction processing phase PS, an address of an instruction fetch packet is sent to program memory 23 via a program address bus PADDR which is part of bus 41. The third phase PW is a wait phase to allow for access time in memory 23. During the fourth phase PR, a program fetch packet is available from program memory 23 via a data bus PDATA_I which is part of bus 41. During the fifth processing phase DP, instruction parallelism is detected and instructions that can be executed are dispatched to the appropriate functional units. This aspect of pipeline operation will be described in more detail in later paragraphs. During the sixth processing phase DC, executable instructions are decoded and control signals are generated to control the various data paths and functional units.

FIG. 3B is a chart which illustrates the execution phases of the instruction execution pipeline in the microprocessor of FIG. 1. During the first execution phase E1, single cycle instructions, referred to as "ISC", and branch instructions, referred to as "BR", are completed. A designated execution unit performs the operations indicated in FIG. 3B as directed by control circuitry 100. During the second execution phase E2, the following types of instructions are completed by designated execution units under control of control circuitry 100: integer multiply (IMPY), program store instructions (STP), and data store instructions (STD). During the third execution phase E3, execution of load data instructions (LD) continues by latching data from the data memory system (DMS), as indicated. During execution phase E4, the data latched in E3 is transferred to a data input register DDATA_I in execution unit D1 or D2. During execution phase E5, the LD instruction is completed by manipulating the data in register DDATA_I and writing the manipulated data to a specified register in register file 20a or 20b.

Figure 4:
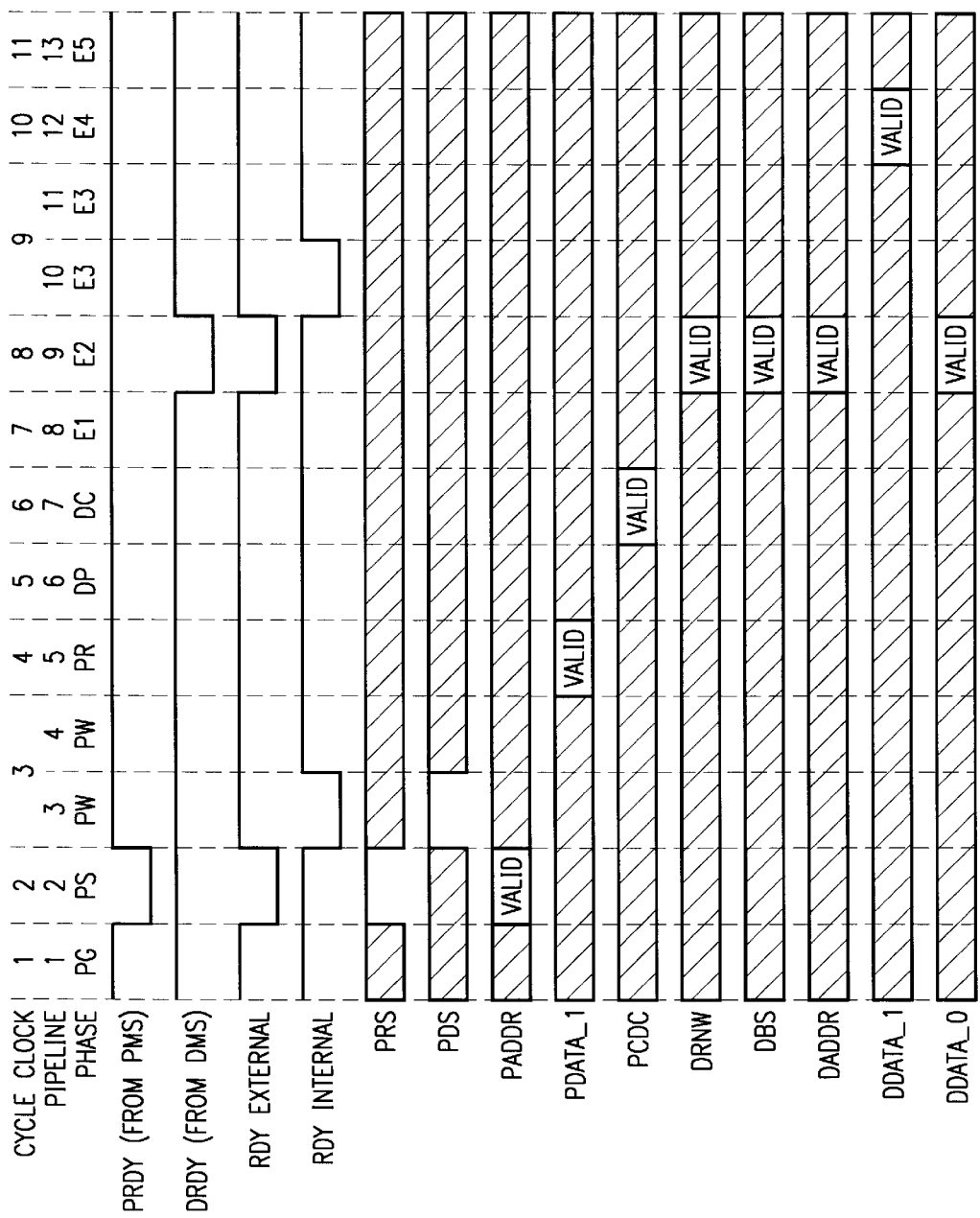
FIG. 4 is a timing diagram which illustrates timing details of processing an instruction fetch packet during the processing phases of FIG. 3A and execution of the execution packet during the execution phases of FIG. 3B.

FIG. 4 is a timing diagram which illustrates timing details of processing an instruction fetch packet during the processing phases of FIG. 3A and execution of the execution packet during the execution phases of FIG. 3B. Note that a pipe stall is illustrated in phase PW due to a program memory ready signal PRDY being low in phase PS, and a second pipe stall in phase E3 due a data memory ready signal DRDY being low in phase E2.

Figure 5:
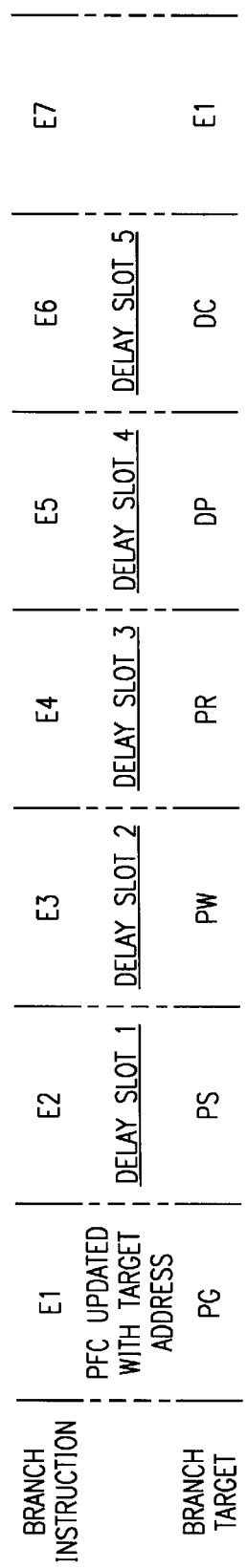
FIG. 5 is a timing diagram which illustrates the delay slots involved when executing a delayed branch in the instruction execution pipeline illustrated in FIGS. 3 and 4.
Figure 6:
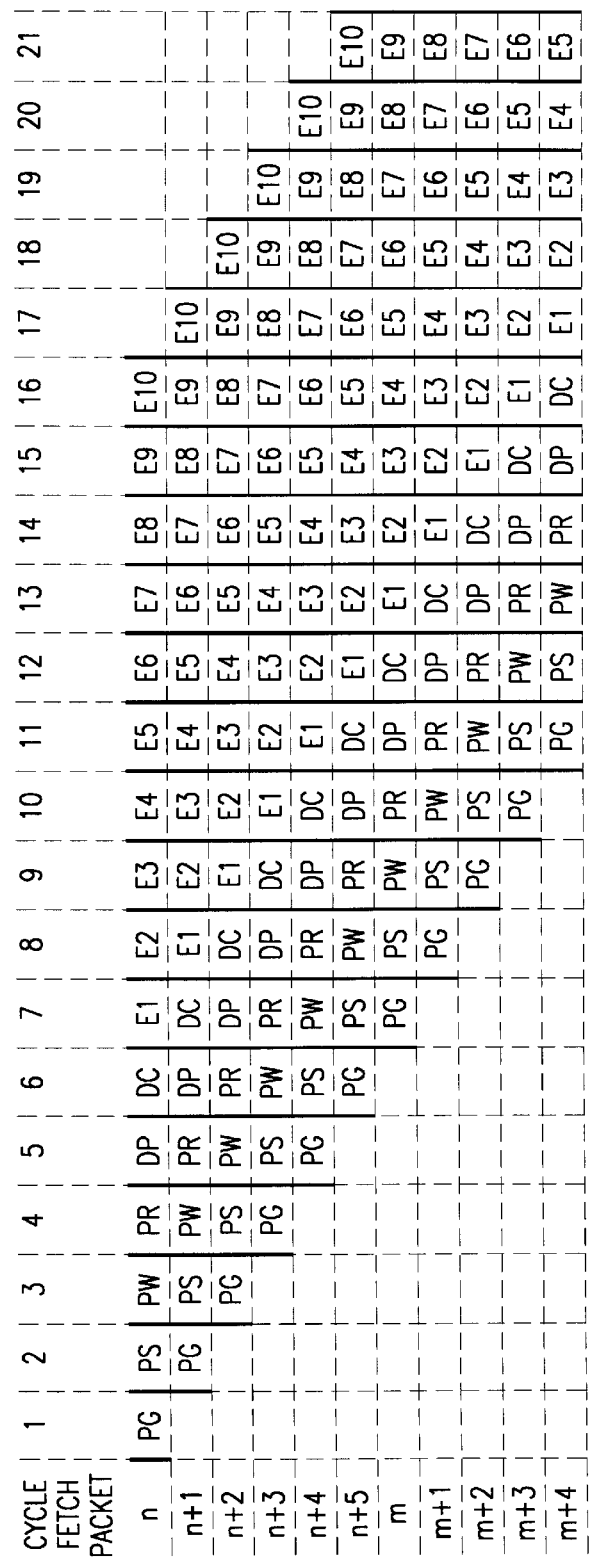
FIG. 6 is a timing chart illustrating instruction processing within the instruction pipeline after a delayed branch is fetched as shown in FIG. 5.

FIG. 5 is a timing diagram which illustrates the delay slots involved when executing a delayed branch instruction (BR) in the instruction execution pipeline illustrated in FIGS. 3 and 4 according to the present invention. A BR instruction provides an address, referred to herein as a "target address," which is the address of the instruction which is to be performed next in the logical sequence of a program being executed by microprocessor 1. During execution phase E1 of the BR instruction, the program fetch counter (PFC), which is part of fetch unit 10a, receives the target address provided by the BR instruction. If the target address is a displacement value, it is shifted and added to the address of the fetch packet which contains the branch instruction prior to being sent to the program fetch counter. If the target address is contained in a register specified by the branch instruction, then the contents of the register is loaded into the program fetch counter. This same phase then corresponds to instruction processing phase PG of the target instruction. As described above with respect to the operation of the instruction pipeline, five more process phases: PS, PW, PR, DP and DC will be completed before the target address instruction begins execution in phase E1. This "delay" between execution phase E1 of the BR instruction and execution phase E1 of the target instruction of represents a "hit" to the execution pipeline due to the change in the stream of instruction addresses. In order to minimize the performance impact of this pipeline hit, microprocessor 1 continues to execute the next five instructions which are sequentially addressed after the BR instruction, as illustrated in FIG. 6. In FIG. 6, an instruction from address "n" is the BR instruction, and the target address of the BR instruction is address "m." The instruction from addresses n+1 through n+5 can perform useful operations, or be a no-operation (NOP) if there is nothing else that can be usefully performed in the program flow. This mode of branch operation is referred to as a "delayed branch" since additional sequential instructions are processed after a branch instruction.

FIG. 7 illustrates the basic format of the instruction packet fetched from memory 23. In one embodiment, an instruction packet includes four 32-bit instructions A, B, C and D. As shown in FIG. 7, instructions A, B, C and D are stored at consecutive addresses in memory 23. Thus, during normal sequential execution of program instructions, instruction A would be executed first, followed sequentially by instructions B, C and D.

Bit 0 of each instruction in FIG. 7 has been designated as a p-bit. The p-bits define how the instructions will be executed. The p-bits of the FIG. 7 instruction packet are inspected from left to right by the program dispatch circuitry 10b during instruction processing phase DP. If the p-bit of a given instruction is equal to logic one, then the next sequential instruction in the packet is to be executed in parallel with the first-mentioned instruction. Program dispatch circuitry 10b applies this rule until an instruction in the instruction packet is reached with a p-bit equal to logic 0.

If a given instruction has a p-bit of 0, then the next sequential instruction is executed sequentially after the given instruction (and after any instructions which are executed in parallel with the given instruction). The program dispatch circuitry 10b applies this rule until it reaches an instruction in the instruction packet with a p-bit of logic 1.

Referring back to FIG. 3A, during process phase PR a new instruction fetch packet is not latched if it is not needed due to sequential execution of at least one of the instructions in a prior fetch packet. Strobe signal PDS, illustrated in FIG. 4, is de-asserted if program data is not needed. In this case, a program data latch PDATA_I maintains the last program fetch packet obtained from program memory 23.

FIGS. 8A–12B provide various examples of the above-described p-bit rules. FIG. 8A illustrates an instruction packet in which all p-bits are 0. Thus, instructions A–D are executed sequentially as shown in FIG. 8B.

FIG. 9A illustrates an instruction packet in which the p-bits of instructions A, B and C are equal to 1, and the p-bit of instruction D is 0. Thus, instructions A, B, C and D are executed simultaneously, that is, in parallel as shown in FIG. 9B.

Figure 10A:
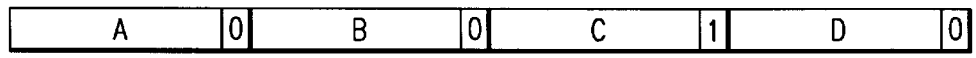
FIG. 10A illustrates another example of an instruction packet according to the format of FIG. 7.
Figure 10B:
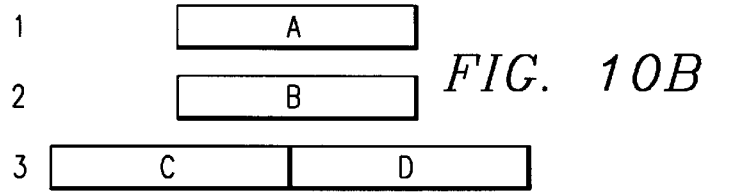
FIG. 10B illustrates the execution sequence defined by the instruction packet of FIG. 8.

In the instruction of FIG. 10A, only the p-bit of instruction C is set to one, resulting in the execution sequence of FIG. 10B, namely, instructions A and B are executed sequentially, followed by instructions C and D which are executed in parallel.

Figure 11A:
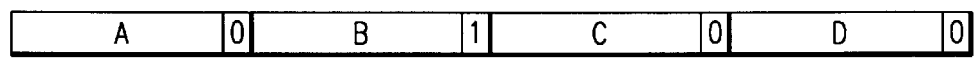
FIG. 11A illustrates another example of an instruction packet according to the format of FIG. 7.
Figure 11B:
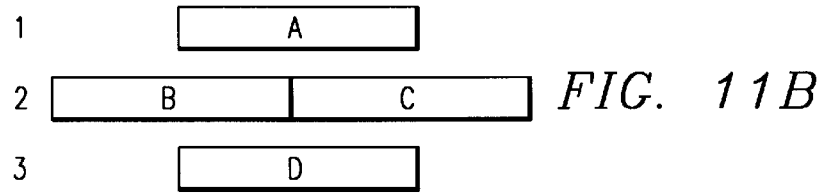
FIG. 11B illustrates the execution sequence defined by the instruction packet of FIG. 11A.

In the instruction packet of FIG. 11A, only the p-bit of instruction B is set to one, resulting in the execution sequence shown in FIG. 11B, namely instruction A is executed and then followed sequentially by the parallel execution of instructions B and C, which is then followed sequentially by execution of instruction D.

Figure 12A:
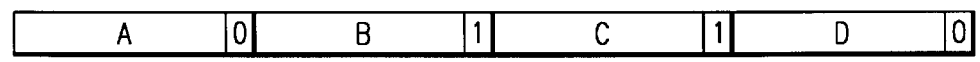
FIG. 12A illustrates another example of an instruction packet according to the format of FIG. 7.
Figure 12B:
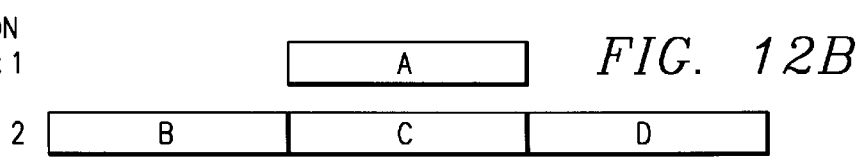
FIG. 12B illustrates the execution sequence defined by the instruction packet of FIG. 12A.

In the instruction packet of FIG. 12A, the p-bits of instructions B and C are set to one, and the p-bits of instructions A and D are zero. This results in the instruction sequence shown in FIG. 12B, namely instruction A is executed and is then sequentially followed by the parallel execution of instructions B, C and D.

Because the instruction packet in the disclosed example includes 4 program instructions, the program compiler can always provide instruction D (the fourth instruction) with a p-bit of 0. The compiler determines the values of the remaining p-bits of instructions A, B and C based on the propriety of executing instructions A and B in parallel, the propriety of executing instructions B and C in parallel, and the propriety of executing instructions A, B and C in parallel. For example, if execution of instruction B requires a result provided by execution of instruction A, then the compiler would provide instruction A with a p-bit of 0 so that instruction B would be executed sequentially after instruction A. As another example, if instructions B and C access the same register, then the compiler would provide instruction B with a p-bit of 0 to ensure that instructions B and C are executed sequentially rather than in parallel.

FIG. 13A illustrates an example of a sequence of instruction packets with nested delayed branch instructions according to the present invention which produces a single phase loop which is executed six times. Instruction fetch packet 1310 which is fetched from address location "n" contains a branch instruction A with a target address of "m." Instruction B in the same fetch packet is executed in parallel with A since the p-bit in A is a 1. Instruction B may perform some other useful operation. Instruction C is also a branch instruction with a target address of m. Instruction D is executed in parallel with C due to the p-bit of instruction C. According to an aspect of the present invention, both instructions C and D begin processing in the first delay slot of instruction A due to the p-bit in B being a 0, as illustrated in FIG. 13B. Advantageously, no interlocks or delays are incurred in the instruction execution pipeline of microprocessor 1 when a branch instruction is followed by a second branch instruction.

Likewise, instructions E, G, I, and K are branch instructions with a target address of m. Instruction pair E–F starts processing in the second delay slot of instruction A, instruction pair G–H starts processing in the third delay slot of instruction A, instruction pair I–J begin processing in the fourth delay slot of instruction A, and instruction pair K–L begin processing in the fifth delay slot of instruction A.

At this point, according to FIG. 6, instruction M now begins processing by fetch packet 1340 being fetched from address m in response to branch instruction A. On the next phase, another copy of instruction M begins processing by fetch packet 1341 being fetched from address m in response to branch instruction C. On the next phase, another copy of instruction M begins processing by fetch packet 1342 being fetched from address m in response to branch instruction E. On the next phase, another copy of instruction M begins processing by fetch packet 1343 being fetched from address m in response to branch instruction G. On the next phase, another copy of instruction M begins processing by fetch packet 1344 being fetched from address m in response to branch instruction I. On the next phase, another copy of instruction M begins processing by fetch packet 1345 being fetched from address m in response to branch instruction K. Since K was the last branch instruction, instruction Q begins processing on the next phase by being fetched from address m+1 as the next sequential address after address m following fetch packet 1345.

As can be seen by examining FIG. 13B, instruction M is executed six times before instruction Q is executed. This effectively creates an iteration loop with zero overhead, which is advantageous for various repetitive tasks such as operations performed on a block of data. It should be apparent that the length of the iteration loop can be varied from two to six by pre-selecting the number of branch instructions which are placed before the loop.

Furthermore, the length of this iteration loop can be dynamically changed by using a conditional feature of the branch instruction. Branch instructions in the present embodiment are conditionally executed. When a specified condition is true, the branch instruction is executed and program flow branches to the target address in a delayed manner as described above. If the condition is false, the branch instruction is treated as a no-operation.

Thus, if instruction C determines that a preselected condition is not met by an appropriate condition signal being detected, then instruction C will not be executed and the iteration loop size will be reduced by one. Likewise, instructions E, G, I or K can be conditionally not executed to reduce the size of the iteration loop.

FIG. 14A illustrates another example of a sequence of instruction packets with nested delayed branch instructions according to the present invention which produces a single phase loop which is executed until a conditional test fails. This example is similar to FIG. 13A, but in this case instruction M is also a branch instruction with a target address of itself. The loop is started as before by placing six branch instructions for sequential processing to fill up the delay slots of the first branch. Once the loop is started, instruction M will be processed six times as instruction fetch packet 1440–1445. Each time branch instruction M is processed, the iteration loop is extended by one phase. Thus, the zero overhead iteration loop will be executed indefinitely. As discussed above, the loop can be exited by the branch instruction detecting that a condition signal is false. It should be noted that branch instruction M will sense the condition signal six times in order for the loop to be completely exited.

During the processing of a branch instruction, microprocessor 1 inhibits interrupt processing. This is to simplify the amount of state that must be saved at the beginning of interrupt processing in order to correctly restore the instruction pipeline to its pre-interrupt condition after the completion of interrupt processing.

Figure 15:
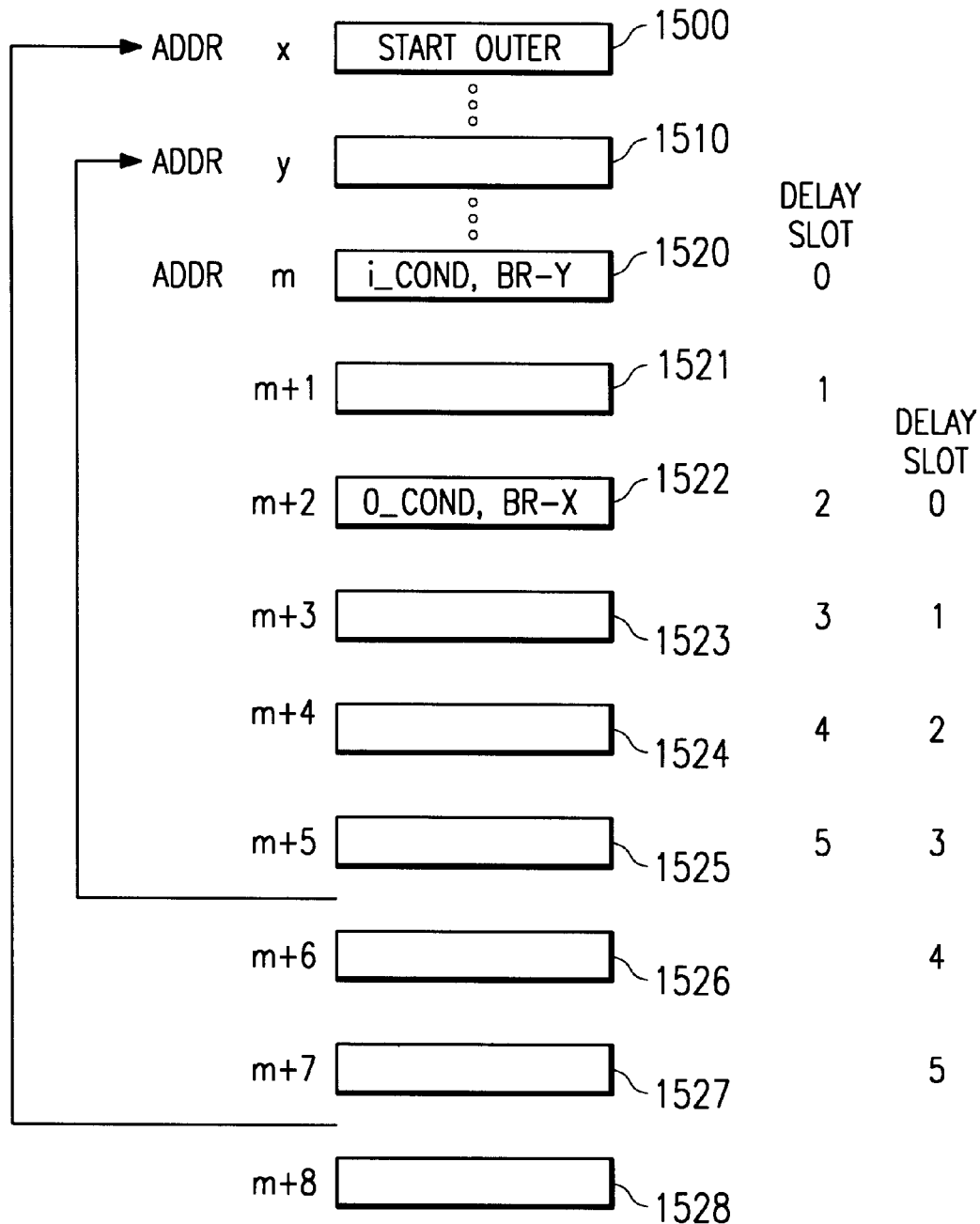
FIG. 15 is a flow chart which illustrates a program having an inner loop and an outer loop which is optimized using nestable delayed branches according to the present invention.
Figure 17:
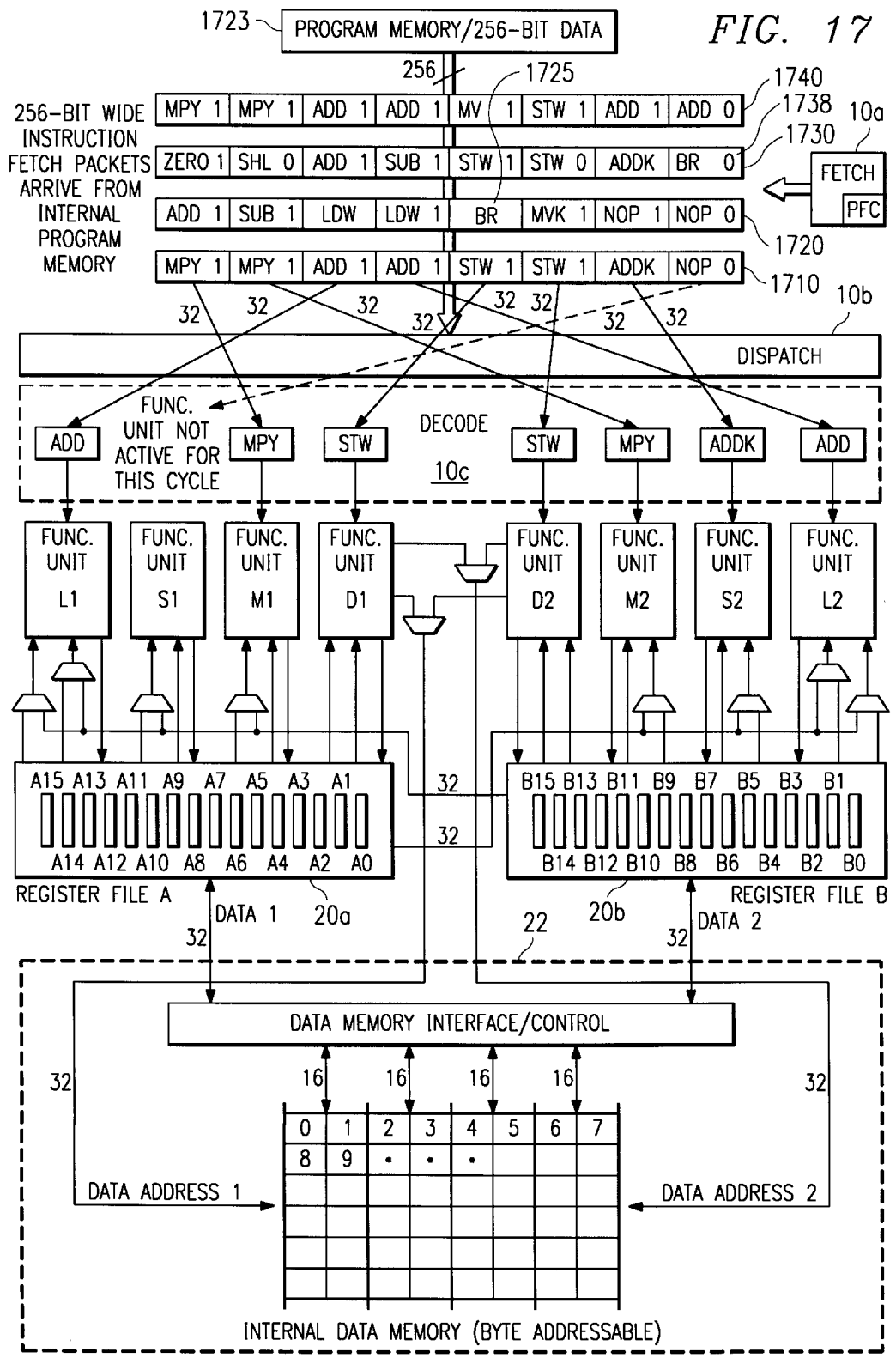
FIG. 17 is a block diagram of a microprocessor which has another embodiment of the present invention, this microprocessor has a 256 bit instruction memory.

FIG. 15 is a flow chart which illustrates a program having an inner loop and an outer loop which is optimized using nestable delayed branches according to the present invention. An outer loop begins execution processing with instruction execution packet 1500 from address x. An inner loop begins execution processing with instruction execution packet 1510 from address y. Any number of instruction packets may be processed between packet 1500 and packet 1510. Furthermore, packets 1500 and 1510 may be the same instruction packet from the same address in some cases. Instruction execution packet 1520 from address m has a branch instruction for the inner loop with a target address of y and is conditional on condition i_cond. Instruction execution packets 1521 and 1522 begin processing in delay slot 1 and 2, respectively, of packet 1520. Instruction packet 1522 has a branch instruction for an outer loop with a target address of x and is conditional on condition o_cond. Packets 1523–1525 are in delay slots 3–5 of packet 1520, and also delay slots 1–3 of packet 1522. If i_cond is true and o_cond is false, then execution packet 1520 will begin processing after packet 1525. If i_cond is false and o_cond is true, then packets 1526 and 1527 will be processed and then packet 1500 will be processed. In this manner, two loops are formed which advantageously have low branching overhead.

As can be seen, many intricate sequences of branching can be performed using the novel techniques of the present invention.

FIGS. 16A–16L illustrate the instruction formats for the microprocessor of FIG. 1, and in particular, FIG. 16L illustrates an instruction format for a nestable delayed branch instruction, according to the present invention. Field "cst" contain a 21 bit address displacement constant which defines a target address. Field "creg" specifies one of eight registers in register file 20 to use for conditional testing. Field "z" specifies whether to test for zero or not zero. When the specified conditional register matches the specified test the branch instruction is executed and program flow branches to the target address in a delayed manner as described above. If the test fails, the branch instruction is treated as a no-operation.

An alternate embodiment of novel aspects of the present invention has other than four instructions in an instruction fetch packet. In one such embodiment illustrated in FIG. 17, the instruction fetch packet contains eight instructions. Instruction fetch packet 1710 is dispatched and decoded to eight execution units as illustrated. Fetch packet 1720 contains a branch instruction 1725. Instruction fetch packet 1730 contains three instruction execute packets. The first execute packet contains two instructions, ZERO-SHL, which will begin processing in the first delay slot of branch instruction 1725. The second execute packet contains four instruction, ADD-SUB-STW-STW, which will begin processing in the second delay slot for branch instruction 1725. The third execute packet contains two instructions, ADDK-BR, which will begin processing in the third delay slot of branch instruction 1725. According to an aspect of the present invention, branch instruction 1738 will begin processing in the third delay slot of branch instruction 1725 and will be completed five pipeline phases later when the target address of branch instruction 1738 is received by a program fetch counter PFC in fetch unit 10a.

An alternative embodiment of the novel aspects of the present invention includes other circuitries which are combined with the circuitries disclosed herein in order to reduce the total gate count of the combined functions. Since those skilled in the art are aware of techniques for gate minimization, the details of such an embodiment will not be described herein.

In another alternative embodiment of the novel aspects of the present invention, interrupt processing is be enabled during branch instruction processing. In this case, interrupts which are received by interrupt circuitry 90 are allowed to interrupt the instruction execution pipeline during the processing of a branch instruction. In order to respond to an interrupt, instruction dispatch unit 10c annuls all instructions in process which have not progressed to process phase DC. This allows all decoded instructions to complete any pending write operations. Therefore, the pipeline can be restarted by refetching and reprocessing the annulled instructions. However, according to a novel aspect of the present invention which permits delayed branches to be nested, simply restarting fetching will not correctly refill the pipeline. Therefore, in order to permit interrupts during the processing of a delayed branch instruction, a state representative of the entire pipeline must be saved prior to processing the interrupt. This state may be saved in a designated area of data memory 22. Upon completion of interrupt processing, the pipeline is restored completely with the saved state information.

In another alternative embodiment of the novel aspects of the present invention, address comparison circuitry in program fetch unit 10a detects when a subsequent fetch packet is from the same address as the preceding fetch packet, such as in FIG. 13B for fetch packets 1341–1345. In such a case, the attempted fetch is inhibited and the previous instruction fetch packet is maintained.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device, comprising:

a central processing unit having an instruction execution pipeline, said pipeline operable to process and execute a first branch instruction having a first target address in a first predetermined number of pipeline phases;

program counter circuitry operable to receive said first target address during a last phase of said predetermined number of pipeline phases to form a first fetch address;

fetch circuitry operable to fetch an instruction fetch packet from said first fetch address specified by said program counter circuitry, said instruction fetch packet having at least one instruction for processing by said instruction execution pipeline;

control circuitry for said instruction execution pipeline operable to begin processing a second branch instruction having a second target address on a pipeline phase immediately after beginning processing of said first branch instruction having said first target address, wherein said control circuitry has no interlock or delay circuitry to condition processing of said second branch instruction based on processing of said first branch instruction; and wherein said program counter circuitry is operable to receive said second target address to form a second fetch address on a pipeline phase immediately after receiving said first target address irrespective of said first fetch address.

2. The data processing device of claim 1, wherein said control circuitry is operable to begin contiguously processing a second number of branch instructions less than or equal to said first predetermined number of pipeline phases, such that each of the second number of branch instructions are processed and executed irrespective of the first fetch address and the second fetch address.

3. The data processing device of claim 2, wherein;

said second number of branch instructions each have a target address of a same target instruction packet; and said fetch circuitry is operable to fetch said target instruction packet for contiguous processing said second number of times, such that a single phase iteration loop comprising said target instruction packet is performed said second number of times.

4. The data processing device of claim 3, wherein:

said target instruction packet contains a branch instruction having a target address of said target instruction packet and said second number of branch instructions equals said first predetermined number of processing phases; and said control circuitry is operable to contiguously start processing said target instruction packet until a control signal is received by said control circuitry, such that said single phase iteration loop comprising said target instruction packet is performed an indefinite number of times.

5. The data processing device of claim 3, further comprising interrupt circuitry which is operable to be inhibited during processing of said iteration loop.

6. The data processing device of claim 3, further comprising:

interrupt circuitry operable to interrupt processing of said interation loop;

state saving circuitry operable to save a state representative of said iteration loop in response to an interrupt from said interrupt circuitry; and state restoration circuitry operable to restore said state representative of said iteration loop, whereby said iteration loop is resumed after said interrupt is processed.

7. A data processing device, comprising:

a central processing unit having an instruction execution pipeline, said pipeline operable to process and execute a branch instruction having a target address in a first predetermined number of pipeline phases;

program counter circuitry operable to receive said target address to form a fetch address during a last phase of said predetermined number of pipeline phases;

fetch circuitry operable to fetch a target instruction fetch packet from said fetch address specified by said program counter circuitry, said target fetch packet having at least one instruction for processing by said instruction execution pipeline;

control circuitry for said instruction execution pipeline operable to begin contiguously processing a second number of branch instructions less than or equal to said first predetermined number of pipeline phases, wherein said control circuitry has no interlock or delay circuitry to condition processing of said second number of branch instructions based on processing of said first branch instruction; and wherein said fetch circuitry is operable to fetch said target instruction fetch packet for contiguous processing said second number of times, such that a single phase iteration loop comprising said target instruction packet is performed said second number of times.

8. A method for operating a central processing unit (CPU) within a data processing device, said method comprising:

providing an instruction execution pipeline which has a first predetermined number of instruction processing phases and a second number of execution phases;

fetching a first instruction packet during a first phase of instruction processing phases, said first instruction packet having at least a first branch instruction with a first target address;

fetching a second instruction packet immediately after said step of fetching a first instruction packet, said second instruction packet having a second instruction with a second target address;

receiving said first target address in a program counter of said CPU on a predetermined one of said execution phases after said first predetermined number of processing phases;

receiving said second target address in said program counter on a phase immediately after said step of receiving said first target address irrespective of said first target address, such that no interlocking is provided between said first branch instruction and said second branch instruction.

9. The method of claim 8, further comprising:

repeatedly fetching another instruction packet having another branch instruction with another target address until a third number of branch instructions are being simultaneously processed in said instruction execution pipeline, wherein said third number is less than or equal to said first predetermined number of processing phases;

fetching a first target instruction packet from said first target address after said program counter has been received in said first target address;

fetching said first target instruction again after said second target address has been received in said program counter, wherein said second target address is the same as said first target address;

fetching said first target instruction packet a plurality of times, wherein said another target address is the same as said first target address, such that a single phase iteration loop comprising said target instruction packet is performed said third number of times.

10. The method of claim 9, wherein:

said target instruction packet contains a branch instruction having a target address of said target instruction packet and said third number of branch instructions equals said first predetermined number of processing phases; and further comprising:

fetching said first target instruction packet a plurality of times until a control signal is received, such that a single phase iteration loop comprising said target instruction packet is performed an indefinite number of times.

11. The method of claim 10 further comprising inhibiting interrupts during processing of said iteration loop.

12. The method of claim 10, further comprising:

interrupting processing of said interation loop;

saving a state representative of said iteration loop in response to an interrupt;

processing said interrupt; and restoring said state representative of said iteration loop, whereby said iteration loop is resumed after said interrupt is processed.

13. A signal processing system, comprising:

sensor means for producing a digital signal in response to a physical input representative of a pattern;

a microprocessor having a central processing unit (CPU) and an internal program memory holding instructions for execution by said CPU to recognize the pattern;

said microprocessor further comprising:

a central processing unit having an instruction execution pipeline, said pipeline operable to process and execute a first branch instruction having a first target address in a first predetermined number of pipeline phases;

program counter circuitry operable to receive said first target address during a last phase of said predetermined number of pipeline phases to form a first fetch address;

fetch circuitry operable to fetch an instruction fetch packet from said first fetch address specified by said program counter circuitry, said instruction fetch packet having at least one instruction for processing by said instruction execution pipeline;

control circuitry for said instruction execution pipeline operable to begin processing a second branch instruction having a second target address on a pipeline phase immediately after beginning processing of said first branch instruction having said first target address, wherein said control circuitry has no interlock or delay circuitry to condition processing of said second branch instruction based on processing of said first branch instruction; and wherein said program counter circuitry is operable receive said second target address on a pipeline phase immediately after receiving said first target address irrespective of said first fetch address.

14. The signal processing system of claim 13 wherein said sensor means includes a microphone and an analog-to-digital converter and said program memory holds instructions for a speech recognition process.

* * * * *